(12) United States Patent
Schenk

(10) Patent No.: US 7,518,770 B2
(45) Date of Patent: Apr. 14, 2009

(54) APPARATUS AND METHOD FOR PROJECTING IMAGES AND/OR PROCESSING MATERIALS

(75) Inventor: Harald Schenk, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 50 days.

(21) Appl. No.: 10/566,904

(22) PCT Filed: Aug. 6, 2003

(86) PCT No.: PCT/DE03/02633

§ 371 (c)(1),
(2), (4) Date: May 24, 2007

(87) PCT Pub. No.: WO2005/015903

PCT Pub. Date: Feb. 17, 2005

(65) Prior Publication Data
US 2006/0209262 A1    Sep. 21, 2006

(51) Int. Cl.
G02B 26/08    (2006.01)

(52) U.S. Cl. ........................ 359/196; 359/201; 359/202; 359/739; 359/900

(58) Field of Classification Search .................. None
See application file for complete search history.

(56) References Cited

U.S. PATENT DOCUMENTS 5,377,006 A * 12/1994 Nakata ........................ 356/486

2002/0196226 A1    12/2002 Tegreene et al. ............ 345/103

FOREIGN PATENT DOCUMENTS

WO    WO 03/032046 A1    4/2003

* cited by examiner

*Primary Examiner*—James Phan
(74) *Attorney, Agent, or Firm*—Renner Kenner Greive Bobak Taylor & Weber

(57) ABSTRACT

The present invention relates to an apparatus for image projecting and/or material processing having a deflection device (3) for variably deflecting a light beam (2) emanating from a light source (1) onto a projection area or a processing area (7), a modulation device (4) for modulating an intensity of the light beam (2) and a control unit (5) which is connected to the modulation device (4) and by means of which the modulation device (4) can be triggered to modulate the intensity of the light beam (2) according to input data.

Disposed between the deflection device (3) and the projection area or the processing area (7) is a shading element (6), by means of which the light beam (2) is faded out within a multiplicity of time intervals, into which the total duration of the projection or the processing is subdivided, for one or a multiplicity of time segments, and the control unit (5) contains a control program which regulates the modulation device (4) during the time segments in such a manner that an at least approximately constant mean intensity of the light beam (2) is yielded in the time intervals.

The present apparatus and the corresponding method permit attaining a temporally constant temperature of the deflection element of the deflection device during processing and/or projection.

20 Claims, 2 Drawing Sheets

APPARATUS AND METHOD FOR PROJECTING IMAGES AND/OR PROCESSING MATERIALS

TECHNICAL FIELD

The present invention relates to an apparatus for projecting images and/or processing materials, the apparatus having a deflection device for variable deflection of a beam of light emanating from a light source onto a projection area or a processing area, a modulation device for modulating the intensity of the light beam and a control unit which is connected to the modulation device and by means of which the modulation device can be triggered to modulate the intensity of the light beam according to input data. Furthermore, the present invention relates to a method for projecting images and/or processing materials, in said method a light beam is conveyed by means of a deflection device via an image region or a processing region of a projection area or a processing area and is simultaneously modulated in order to obtain image projection or material processing corresponding to input data.

When employing an apparatus of the mentioned sort, in order to project images, the image region of the projection area is usually scanned by a light beam with a constant line frequency and column frequency while simultaneously the intensity of the light beam is modulated according to input data to represent an image or a sequence of images. The image can be used for information representation or in the case of correspondingly high light power intensity also for lettering or material processing. In the simplest case, the representation may be a representation of a one-dimensional figure with deflection in only one direction. Generally, however, the light beam is deflected in two directions to create a flat image.

In employing a generic apparatus for material processing, the deflection device can also be triggered according to input data to guide the light beam along a specific path over the processing region of the processing area predefined by the processing parameters while the light intensity is simultaneously modulated accordingly.

PRIOR ART

Generic apparatuses are realized as microscanners or as precision scanners that can be operated resonantly as well as quasi-statically. For example, WO 03/032046 A1 describes a projection apparatus that is used to represent images, patterns, lettering or symbols or to illuminate a photosensitive material. This projection apparatus comprises a deflection device to deflect a light beam about a first deflection axis with a first deflection frequency and about a second deflection axis with a second deflection frequency to move the light beam over the image area. The intensity of the light beam is modulated by means of a modulation device according to the to-be-projected image. In an embodiment of this printed publication, the deflection device has a unit to fade out the light source as soon as the light beam is deflected by the deflection device into a peripheral region of the projection area. In this connection, it is explained that this can be achieved by, for example, switching off the light source in this peripheral region and that serves to homogenize image dot density during projection.

When using powerful light sources, such as for instance lasers, to generate very great light power intensity, as required in particular in material processing, the mobile deflection mirror of the deflection device becomes hot due to finite absorption, which can lead to thermally induced curvature of the mirror and/or, for example in the case of spring-suspended microscanner mirrors, to altering the spring constants. The curvature of the mirror leads to defocusing, the alteration of the spring constants, in particular in the case of resonantly operated microscanners, to the alteration of the resonance amplitude or to desynchronization in relation to the image data flow. In this case, the mean intensity received by the mirror is generally not temporally constant, because the mean intensity of the light beam changes according to the to-be-represented image or the to-be-conducted material processing. Therefore, even after a warming-up phase of the apparatus, no constant mirror temperature is attained.

In order to prevent these problems, large mirrors can principally be cooled. This cooling, however, is complicated and expensive and, especially in the case of microscanner mirrors, cannot be technically realized in a practical manner, because cooling has to occur with very good thermal contact to the mirror. Therefore, for microscanner mirrors there is no known technical solution to prevent the aforementioned problems.

The object of the present invention is to provide an apparatus and a method for image projecting and/or material processing, in which fluctuations in temperature on the beam deflection elements of the deflection device during projecting and/or processing are considerably reduced.

SUMMARY OF THE INVENTION

The present apparatus for projecting images and/or processing materials is provided with a deflection device to variably deflect a light beam emanating from the light beam onto a projection area or a processing area, a modulation device to modulate an intensity of the light beam and a control unit which is connected to the modulation device and by means of which the modulation device can be triggered to modulate the intensity of the light beam according to input data. The apparatus is distinguished by a shading element being disposed between the deflection device and the projection area or the processing area, with said shading the light beam can be faded out for one or a multiplicity of time segments within a multiplicity of time intervals, into which the total duration of the projection and/or the processing is subdividable, and the control unit includes a control program which regulates the modulation device during these time segments in such a manner that an at least approximately constant mean light intensity of the light beam is yielded in the time intervals.

In the corresponding method, the light beam is conveyed by means of the deflection device via an image region or processing region of the projection area or the processing area and is simultaneously modulated in intensity according to the input data to obtain image representation or material processing according to the input data. In the method, the total duration of the projection and/or the processing is subdivided into a multiplicity time intervals. The light beam is faded out between the deflection device and the projection area or the processing area for one or a multiplicity of time segments within each time interval and adjusted in intensity in these time segments in such a manner that an at least approximately constant mean intensity of the light beam is achieved in all the time intervals.

The temporary fading out of the light beam, which occurs solely by means of the shading element or by means of the deflection device in conjunction with the shading element, and the corresponding regulation of the light intensity permit achieving an approximately constant thermal input in the deflection element and thus by selecting correspondingly short time intervals, obtaining a temporally constant temperature of this deflection element during image projection or material processing. Processing images, respectively processing materials, occurs with the intensity course of the light beam according to the input data, the fading out pauses, of course, being taken into consideration. However, the temporary fading out permits adjusting the light intensity within the time segments, in which the light beam is conveyed in the same manner via the deflection element, in such a manner that the same mean light intensity of the light beam is yielded for each predefined time interval without influencing image projection or material processing. Differences in the course of the intensity of the light beam for projection images or processing materials from time interval to time interval can be compensated in a simple manner.

The differences in the course of intensity are known from the input data, the fading out time segments from the placement of the shading element and the deflection parameters of the deflection device.

Fading out the light beam can be achieved, for example, by means of an optical shutter which is placed in the beam path between the deflection device and the projection area and which interrupts the light beam at certain time points, for example periodically. In the preferred embodiment of the present apparatus and the present method, however, a shading element is provided which delimits the image region or processing region at least on one side by means of a margin, the light beam being repeatedly conveyed by the deflection device onto the margin during projection and/or processing to achieve the fading out. The region (scan region) covered by the deflection device is thus larger than the image area, respectively processing area, delimited by the shading element.

The present apparatus and the method functions are explained again in the following in an exemplary manner using the image projection of a sequence of images. Execution can, of course, be readily applied to the time intervals in material processing. The time intervals selected in the present example of image projection correspond to the duration of the representation of an image. They may, of course, be longer or shorter than the representation time of an image and are selected primarily according to the thermal propagation on the deflection element to achieve minimal or no temperature fluctuations in the deflection element. The duration of the time intervals may also vary during projection or processing.

If the light beam requires the time t for the representation of the whole image, this time interval is composed of the time $t_1$ for the part being imaged and the time $t_2$ for the part faded out. Given is: $t=t_1+t_2$. If in the case of the image n for $t_1$, the mean intensity $I_{mean,1,n}$ is used for imaging, with generally $I_{mean,1,n} \neq I_{mean,2,k}$ with $k \neq n$, during $t_2$ the intensity $I_{mean,2,n}$ is adjusted in such a manner that in each interval $$I_{mean,1} \times t_1 + I_{mean,2} \times t_2 = \text{constant.} \quad (1)$$

In this manner, always the same mean intensity is conveyed via the mirror, with the part of the light beam reaching imaging being variable as desired with suited selection of the parameters.

The present apparatus and the corresponding method can be utilized with any deflection devices, light sources and modulation devices.

Thus, microscanners, precision scanners, vector scanners, resonantly operated scanners or quasi-static scanners can be used in the state-of-the-art manner as the deflection device. The deflection device preferably comprises uniaxially or biaxially movable mirrors. However, two uniaxially movable mirrors connected in series whose axes of motion are disposed perpendicular to each other can achieve two-dimensional beam deflection in the same manner as if using one biaxially movable mirror. The present apparatus and the corresponding method can also be realized by means of deflection devices that deflect only in one dimension.

The light source may be a component of the apparatus or provided separately, with the light beam in that case being coupled in accordingly. In addition to the frequently used lasers and light diodes, general thermal light sources or gas discharge lamps can be employed as light sources. The apparatus can, of course, also be operated using pulsed light radiation.

The modulation device can either regulate the output of the light source directly or be disposed in the light beam as a separate modulator. In prior-art projection apparatuses, contrast is achieved by switching the light beam on and off, respectively by means of gray-step modulation. This technique can also be employed in the present apparatus and the present method.

If need be, the present apparatus, of course, also includes focusing optics with which the light beam is usually focused onto the projection area or the processing area as required in many applications.

BRIEF DESCRIPTION OF THE DRAWINGS

The present apparatus and the corresponding method are made more apparent in the following using preferred embodiments with reference to the accompanying drawings.

WAYS TO CARRY OUT THE INVENTION

Figure 1:
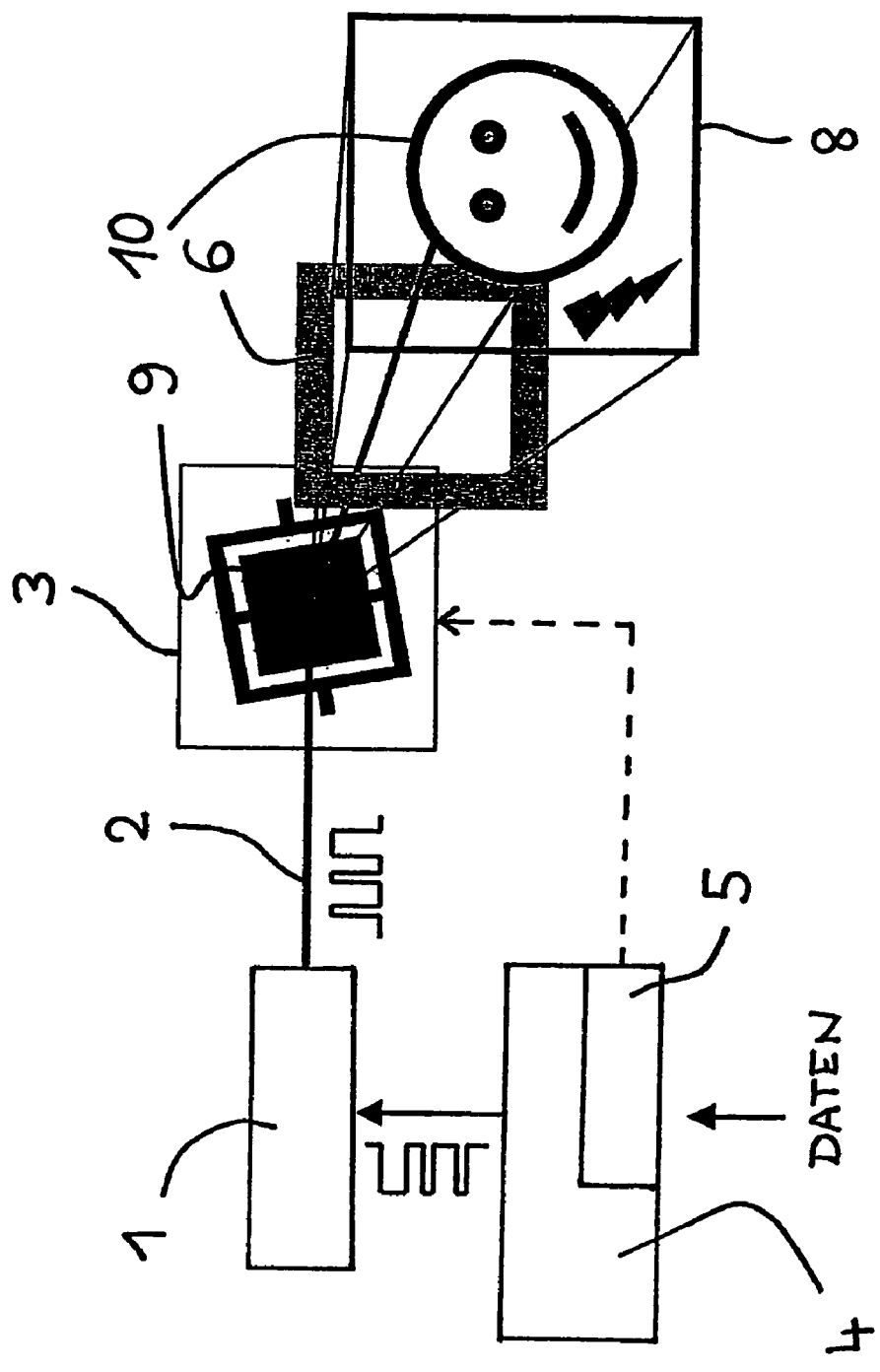
FIG. 1 shows an example of a preferred embodiment of the present apparatus for projecting images.

FIG. 1 shows schematically an example of a possible embodiment of the present apparatus. For clarity, the figure is not drawn to scale and shows an apparatus for monochrome representation of an image. In this example, the apparatus is composed of a laser 1 as the light source, the deflection device 3, a diaphragm 6 as shading element between the deflection device 3 and the projection area 7, the modulation device 4 and the control unit 5. The diaphragm 6 should, of course, be placed at a correspondingly large distance from the projection area 7, i.e. as close as possible to the deflection device 3 to prevent scattering and diffraction effects. The deflection device 3 comprises a biaxially movable micromirror 9 as the deflection element. The image data are conveyed to the control unit 5 connected to the modulation device 4 and are processed there according to, in this case, a fixed ratio of time to the excursion angle of the deflection device 3. The control unit 5 then causes modulation device 3 to regulate the intensity of the laser beam 1 emitting thus a laser beam 2 modulated accordingly in intensity. The laser beam 2 is moved by the deflection device 3, in particular by the biaxially movable suspended mirror 9 over the projection area 7, the diaphragm cutting out the peripheral region of the projection area 7 in such a manner that a limited image region 8 is yielded through the diaphragm aperture for representation of the image 10. Thus the deflection device 3 scans a larger solid angle region with the laser beam 2 than is visible on the projection area. The modulation of the laser beam 2 for representation of image 10 occurs only within the image region 8. Beyond image region 8, the laser beam impinges on the diaphragm 6 in such a manner that during this time segment it does not contribute to representation of the image. In order to keep the mean light intensity conveyed via the mirror 9 constant from image to image, according to equation (1) of the preceding section, light intensity is adjusted accordingly during this time segment by the modulation device 4. In this manner, an approximately constant temperature of the mirror 9 is ensured during total projection. The length of the time intervals selected for the constant mean intensity is dependent on the thermal propagation on the deflection element, in this case the mirror 9. Thus, in the case of deflection elements with relatively great thermal capacity, for example, a multiplicity of images can be averaged, i.e. the time intervals are selected correspondingly large for the averaging. On the other hand, in the case of relatively small thermal capacity of the deflection element, it can be advantageous, for example in the case of scanning deflection to even average line for line.

Figure 2:
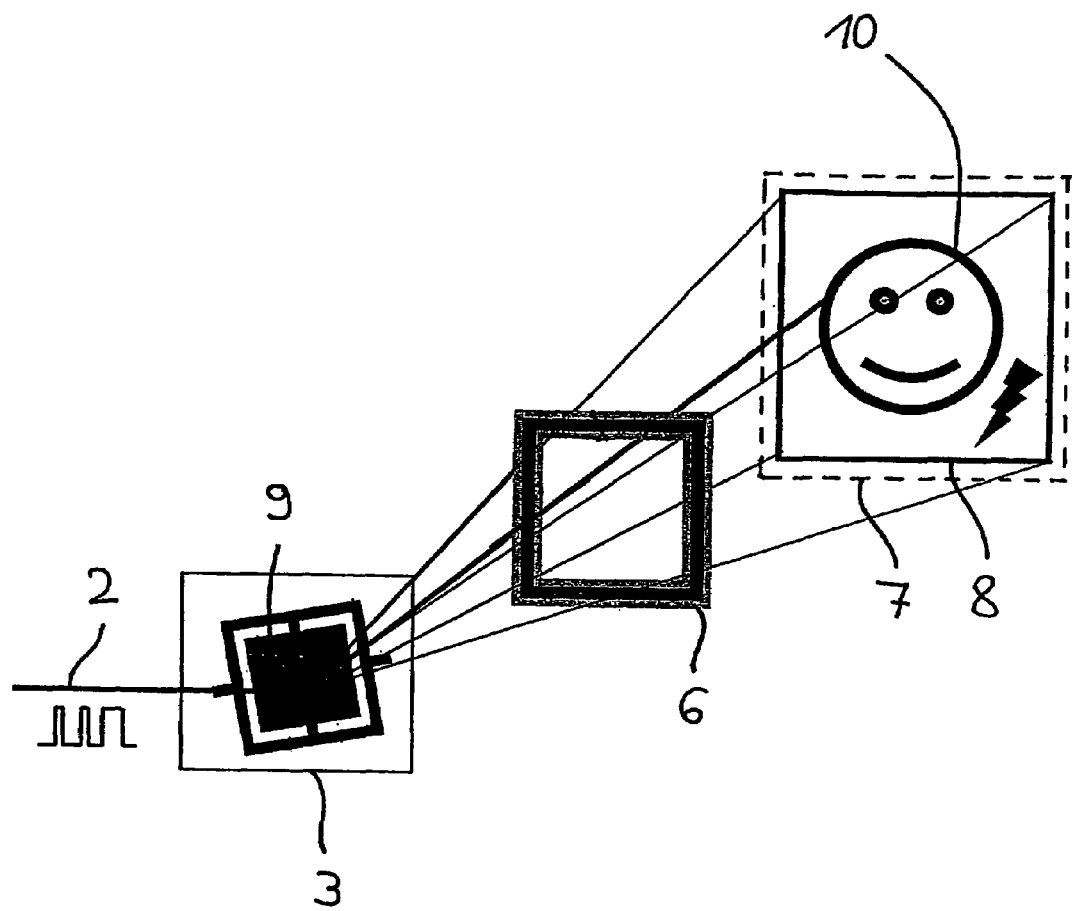
FIG. 2 shows another view of a region of the example of FIG. 1.

FIG. 2 shows the same setup without the modulation device, the control unit or the laser. In this case, however, in a view in which projection occurs away from the observer.

Figure 3:
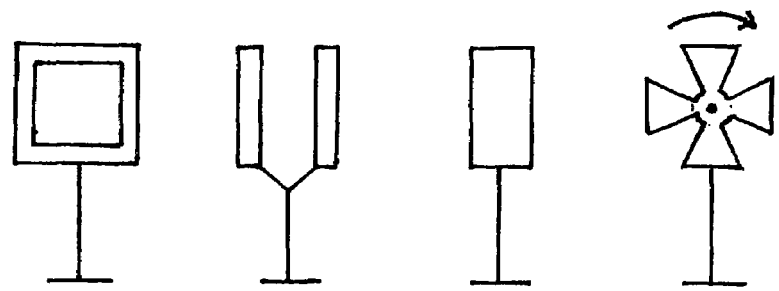
FIG. 3 shows examples of shading elements as utilized in the present apparatus and present method.

In addition to a diaphragm as a shading element, other shading elements, of which some are shown as examples in FIG. 3, can be used in the present apparatus and the present method. From left to right, FIG. 3 depicts first the prior-art diaphragm, then an element which delimits the image region only on one side, next an element which delimits the image region on two sides, for example a simple metal plate, and finally an optical shutter which rotates with a constant frequency, indicated by the arrow, in such a manner that it periodically interrupts the light beam.

LIST OF REFERENCES 1 laser
2 laser beam
3 deflection device
4 modulation device
5 control unit
6 diaphragm
7 projection area or processing area
8 image region of processing region
9 biaxially movable micromirror
10 image

What is claimed is:

1. An apparatus for image projection and/or material processing having a deflection device (3) for variably deflecting a light beam (2) emanating from a light source (1) onto a projection area or a processing area (7), a modulation device (4) for modulating an intensity of the light beam (2) and a control unit (5) which is connected to the modulation device (4) and by means of which the modulation device (4) can be triggered to modulate the intensity of the light beam (2) according to input data, wherein
    disposed between the deflection device (3) and the projection area or the processing area (7) is a shading element (6), by means of which the light beam (2) is faded out within a multiplicity of time intervals, into which the total duration of the projection or the processing is sub-divided, for one or a multiplicity of time segments, and the control unit (5) contains a control program which regulates the modulation device (4) during the time segments in such a manner that an at least approximately constant mean intensity of the light beam (2) is yielded in the time intervals.

2. An apparatus according to claim 1, wherein
the shading element (6) provides a delimitation of an image region or processing region (8) by means of a margin on at least one side on the projection area or the processing area (7), with the deflection device (3) being designed or triggered in such a manner that during projection or processing, the light beam (2) is repeatedly deflected also to the regions of the margin of the shading element (6).

3. An apparatus according to claim 1, wherein
the shading element (6) is a diaphragm whose diaphragm aperture provides a delimitation of an image region or processing region (8) on the projection area or the processing area (7), with the deflection device (3) being designed or triggered in such a manner that during projection or processing, the light beam (2) is repeatedly deflected also to regions of the diaphragm beyond the diaphragm aperture.

4. An apparatus according to claim 1, wherein
the shading element (6) is an optical shutter, which blocks and releases the light beam (2) periodically during projection or processing.

5. An apparatus according to claim 1, wherein
the deflection device (3) comprises one or a multiplicity of uniaxially movable mirrors.

6. An apparatus according to claim 1, wherein
the deflection device (3) comprises at least one biaxially movable mirror.

7. An apparatus according to claim 1, wherein
the deflection device (3) is a microscanner.

8. An apparatus according to claim 1, wherein
the light source (1) is formed by one or a multiplicity of lasers or light diodes.

9. An apparatus according to claim 1, wherein
the control unit (5) is connected to the deflection device (3) and designed in such a manner that the deflection device (3) can be triggered by the control unit (5) according to the input data to move the light beam (2) over the projection area or the processing area (7).

10. Use of the apparatus according to claim 1 to project a sequence of images.

11. Use of the apparatus according to claim 1 to visualize information on the projection area.

12. Use of the apparatus according to claim 1 to letter the processing area.

13. Use of the apparatus according to claim 1 to expose photosensitive material.

14. A method for projecting images and/or processing materials, the method comprising:
    conveying a light beam (2) by means of a deflection device (3) over an image region or a processing region (8) of a projection area or a processing area (7) and wherein the light beam is simultaneously modulated in intensity according to input data in order to achieve projection or processing according to the input data,
    sub-dividing a total duration of the projection or the processing into a multiplicity of time intervals,
    fading the light beam (2) out between the deflection device (3) and the projection area or the processing area (7) for one or a multiplicity of time segments of each time interval, and
    adjusting the intensity in these time segments in such a manner that an at least approximately constant mean intensity of the light beam (2) is yielded in the time intervals.

15. A method according to claim 14, further comprising
providing a shading element (6) between the deflection device (3) and the projection area or the processing area (7) to fade out the light beam (2), which forms a delimitation by means of a margin at least on one side of an image region or a processing region (8) on the projection area or the processing area (7), with the light beam (2)

being deflected by the deflection device (3) in such a manner that during projection or processing, the laser beam (2) repeatedly impinges also on regions of the margin of the shading element (6).

16. A method according to claim 14, wherein providing a diaphragm between the deflection device (3) and the projection area or the processing area (7) to fade out the light beam (2), wherein the diaphragm has a diaphragm aperture that forms a delimitation of an image region or a processing region (8) on the projection area or the processing area (7), with the light beam (2) being deflected by the deflection device (3) in such a manner that the light beam (2) repeatedly impinges also on the regions of the diaphragm beyond the diaphragm aperture.

17. A method according to claim 14 further comprising projecting a sequence of images.

18. A method according to claim 14 further comprising visualizing information on the projection area.

19. A method according to claim 14 further comprising lettering the processing area.

20. A method according to claim 14 further comprising exposing photosensitive material to the light beam.

* * * * *